(12) United States Patent
Wang et al.

(10) Patent No.: US 6,863,453 B2
(45) Date of Patent: Mar. 8, 2005

(54) METHOD AND APPARATUS FOR PARALLEL OPTICAL TRANSCEIVER MODULE ASSEMBLY

(75) Inventors: Charlie X. Wang, Albuquerque, NM (US); Hong Q. Hou, Albuquerque, NM (US); Frederick B. McCormick, Albuquerque, NM (US)

(73) Assignee: Emcore Corporation, Somerset, NJ (US)

(*) Notice: Subject to any disclaimer, the term of this patent is extended or adjusted under 35 U.S.C. 154(b) by 103 days.

(21) Appl. No.: 10/352,725

(22) Filed: Jan. 28, 2003

(65) Prior Publication Data

US 2004/0146253 A1 Jul. 29, 2004

(51) Int. Cl.[7] ................................................. G02B 6/42
(52) U.S. Cl. ............................................... 385/94; 385/93
(58) Field of Search ..................................... 385/88–94

(56) References Cited

U.S. PATENT DOCUMENTS

| | | |
|---|---|---|
| 3,996,461 A | 12/1976 | Sulzbach et al. |
| 4,145,110 A | 3/1979 | Szentesi |
| 4,276,113 A | 6/1981 | Carlsen et al. |
| 4,311,359 A | 1/1982 | Keller |
| 4,327,964 A | 5/1982 | Haesly et al. |
| 4,329,190 A | 5/1982 | Berg et al. |
| 4,432,604 A | 2/1984 | Schwab |
| 4,470,660 A | 9/1984 | Hillegonds et al. |
| 4,479,698 A | 10/1984 | Landis et al. |
| 4,547,039 A | 10/1985 | Caron et al. |

(List continued on next page.)

FOREIGN PATENT DOCUMENTS

| | | |
|---|---|---|
| DE | 40 02 370 | 8/1991 |
| DE | 41 23 370 A1 | 1/1993 |
| EP | 0 259 888 A2 | 3/1988 |
| EP | 0 440 336 A2 | 8/1991 |
| EP | 0 589 622 | 3/1994 |

(List continued on next page.)

OTHER PUBLICATIONS

Cheong, J–M et al.; High Alignment Tolerance Coupling Scheme for Multichannel Laser Diode/Singlemode Fibre Modules Using A Tapered Waveguide Array; Electronics Letters; IEE Stevenage; GB; vol. 20; No. 18; Sep. 1, 1994; pp. 1515–1516; XP0004760076; ISSN: 0013–5194; whole document.

Simonis et al; 1 Gb/s VCSEL/CMOS Flip–Chip 2–D Array Interconnects and Associated Diffactive Optics; 1999 Parallel Interconnect 1999 (PI '99); pp. 1–9.

KIBAR et al.; Power Minimization and Technology Comparison for Digital Free–Space Optoelectronic Interconnections; Apr., 1999; Journal of Lightwave Technology; vol. 17; No. 4; pp. 546–555.

(List continued on next page.)

*Primary Examiner*—Akm Enayet Ullah
*Assistant Examiner*—Sarah Song
(74) *Attorney, Agent, or Firm*—White & Case LLP

(57) ABSTRACT

An apparatus and method of modular manufacturing process for a parallel optical transmitter, receiver and/or transceiver is disclosed. The modular process assembles an array of optoelectronic devices to an array header to form an optoelectronic array package. Once the optoelectronic array package is assembled, it is tested and verified the functionality and alignment between the optoelectronic devices and optical fibers. The optoelectronic array package is subsequently coupled to an optical lens array to form an array optical subassembly. After the array optical subassembly is tested, it is coupled to an optical fiber connector to form an optical module. The optical module is then tested to verify its functionality and alignment.

3 Claims, 7 Drawing Sheets

U.S. PATENT DOCUMENTS

| | | |
|---|---|---|
| 4,563,725 A | 1/1986 | Kirby |
| 4,597,631 A | 7/1986 | Flores |
| 4,645,295 A | 2/1987 | Pronovost |
| 4,678,264 A | 7/1987 | Bowen et al. |
| 4,692,883 A | 9/1987 | Nelson et al. |
| 4,708,833 A | 11/1987 | Ohsawa et al. |
| 4,709,979 A | 12/1987 | Spodati et al. |
| 4,729,623 A | 3/1988 | Mery |
| 4,730,198 A | 3/1988 | Brown et al. |
| 4,744,626 A | 5/1988 | Mery |
| H491 H | 7/1988 | Pitruzzello et al. |
| 4,767,179 A | 8/1988 | Sampson et al. |
| 4,767,430 A | 8/1988 | Deneka et al. |
| 4,772,123 A | 9/1988 | Radner |
| 4,798,440 A | 1/1989 | Hoffer et al. |
| 4,836,645 A | 6/1989 | Lefevre et al. |
| 4,840,151 A | 6/1989 | Sakata |
| 4,844,573 A | 7/1989 | Gillham et al. |
| 4,845,052 A | 7/1989 | Abend |
| 4,863,233 A | 9/1989 | Nienaber et al. |
| 4,883,956 A | 11/1989 | Melcher et al. |
| 4,926,545 A * | 5/1990 | Pimpinella et al. ............ 29/832 |
| 4,973,127 A | 11/1990 | Cannon, Jr. et al. |
| 4,979,787 A | 12/1990 | Lichtenberger |
| 4,993,803 A | 2/1991 | Suverison et al. |
| 5,013,247 A | 5/1991 | Watson |
| 5,040,868 A | 8/1991 | Waitl et al. |
| 5,042,709 A | 8/1991 | Cina et al. |
| 5,042,891 A | 8/1991 | Mulholland et al. |
| 5,050,953 A | 9/1991 | Anderson et al. |
| 5,054,879 A | 10/1991 | Brown |
| 5,061,033 A | 10/1991 | Richard |
| 5,067,785 A | 11/1991 | Schirbl et al. |
| 5,071,219 A | 12/1991 | Yurtin et al. |
| 5,076,656 A | 12/1991 | Briggs et al. |
| 5,076,688 A | 12/1991 | Bowen et al. |
| 5,091,991 A | 2/1992 | Briggs et al. |
| 5,101,465 A | 3/1992 | Murphy |
| 5,104,243 A | 4/1992 | Harding |
| 5,109,447 A | 4/1992 | Chan |
| 5,109,453 A | 4/1992 | Edwards et al. |
| 5,113,461 A | 5/1992 | Ortiz, Jr. |
| 5,117,476 A | 5/1992 | Yingst et al. |
| 5,127,073 A | 6/1992 | Mulholland et al. |
| 5,138,679 A | 8/1992 | Edwards et al. |
| 5,138,680 A | 8/1992 | Briggs et al. |
| 5,151,961 A | 9/1992 | Hvezda et al. |
| 5,155,784 A | 10/1992 | Knott |
| 5,155,786 A | 10/1992 | Ecker et al. |
| 5,163,109 A | 11/1992 | Okugawa et al. |
| 5,165,002 A | 11/1992 | Cumberledge et al. |
| 5,168,537 A | 12/1992 | Rajasekharan et al. |
| 5,195,156 A | 3/1993 | Freeman et al. |
| 5,199,087 A | 3/1993 | Frazier |
| 5,202,943 A | 4/1993 | Carden et al. |
| 5,204,925 A | 4/1993 | Bonanni et al. |
| 5,212,754 A | 5/1993 | Basavanhally et al. |
| 5,214,444 A | 5/1993 | Kerr et al. |
| 5,226,052 A | 7/1993 | Tanaka et al. |
| 5,230,030 A | 7/1993 | Hartman et al. |
| 5,231,685 A | 7/1993 | Hanzawa et al. |
| 5,233,676 A | 8/1993 | Yonemura et al. |
| 5,233,677 A | 8/1993 | Winslow |
| 5,239,606 A | 8/1993 | Shibutani et al. |
| 5,243,678 A | 9/1993 | Schaffer et al. |
| 5,245,683 A | 9/1993 | Belenkiy et al. |
| 5,251,614 A | 10/1993 | Cathignol et al. |
| 5,259,053 A | 11/1993 | Schaffer et al. |
| 5,263,108 A | 11/1993 | Kurokawa et al. |
| 5,280,551 A | 1/1994 | Bowen |
| 5,295,214 A | 3/1994 | Card et al. |
| 5,309,537 A | 5/1994 | Chun et al. |
| 5,325,454 A | 6/1994 | Rittle et al. |
| 5,325,455 A | 6/1994 | Henson et al. |
| 5,329,604 A | 7/1994 | Baldwin et al. |
| 5,333,225 A | 7/1994 | Jacobowitz et al. |
| 5,337,396 A | 8/1994 | Chen et al. |
| 5,337,398 A | 8/1994 | Benzoni et al. |
| 5,341,446 A | 8/1994 | Shibata |
| 5,345,527 A | 9/1994 | Lebby et al. |
| 5,345,529 A | 9/1994 | Sizer et al. |
| 5,347,604 A | 9/1994 | Go et al. |
| 5,353,364 A | 10/1994 | Kurashima |
| 5,359,686 A | 10/1994 | Galloway et al. |
| 5,361,318 A | 11/1994 | Go et al. |
| 5,371,820 A | 12/1994 | Welbourn et al. |
| 5,371,822 A | 12/1994 | Horwitz et al. |
| 5,386,488 A | 1/1995 | Oikawa |
| 5,390,271 A | 2/1995 | Priest |
| 5,394,503 A | 2/1995 | Dietz, Jr. et al. |
| 5,416,872 A | 5/1995 | Sizer, II et al. |
| 5,418,875 A | 5/1995 | Nakano et al. |
| 5,420,954 A | 5/1995 | Swirhun et al. |
| 5,428,704 A | 6/1995 | Lebby et al. |
| 5,430,820 A | 7/1995 | van Tongeren et al. |
| 5,434,939 A | 7/1995 | Matsuda |
| 5,436,997 A | 7/1995 | Makiuchi et al. |
| 5,436,998 A | 7/1995 | Morgan et al. |
| 5,440,658 A | 8/1995 | Savage, Jr. |
| 5,450,508 A | 9/1995 | Decusatis et al. |
| 5,450,514 A | 9/1995 | Hotea et al. |
| 5,452,388 A | 9/1995 | Rittle et al. |
| 5,467,419 A * | 11/1995 | Roff et al. .................... 385/92 |
| 5,473,716 A | 12/1995 | Lebby et al. |
| 5,475,215 A | 12/1995 | Hsu |
| 5,475,783 A | 12/1995 | Kurashima |
| 5,502,785 A | 3/1996 | Wang et al. |
| 5,506,921 A | 4/1996 | Horie |
| 5,511,089 A | 4/1996 | Yamada |
| 5,515,467 A | 5/1996 | Webb |
| 5,521,992 A | 5/1996 | Chun et al. |
| 5,522,002 A | 5/1996 | Chun et al. |
| 5,524,160 A | 6/1996 | Debeaux et al. |
| 5,535,296 A | 7/1996 | Uchida |
| 5,539,848 A | 7/1996 | Galloway |
| 5,546,490 A | 8/1996 | Kikuchi et al. |
| 5,548,676 A | 8/1996 | Savage, Jr. |
| 5,574,814 A * | 11/1996 | Noddings et al. ............ 385/90 |
| 5,577,145 A | 11/1996 | Musk |
| 5,577,146 A | 11/1996 | Musk |
| 5,596,663 A | 1/1997 | Ishibashi et al. |
| 5,596,665 A | 1/1997 | Kurashima et al. |
| 5,602,955 A | 2/1997 | Haake |
| 5,604,831 A | 2/1997 | Dittman et al. |
| 5,625,734 A | 4/1997 | Thomas et al. |
| 5,630,988 A | 5/1997 | Stolp |
| 5,631,988 A | 5/1997 | Swirhun et al. |
| 5,647,042 A | 7/1997 | Ochiai et al. |
| 5,657,409 A | 8/1997 | Raskin et al. |
| 5,677,973 A | 10/1997 | Yuhara et al. |
| 5,727,097 A | 3/1998 | Lee et al. |
| 5,742,480 A | 4/1998 | Sawada et al. |
| 5,745,624 A | 4/1998 | Chan et al. |
| 5,768,456 A | 6/1998 | Knapp et al. |
| 5,774,614 A | 6/1998 | Gilliland et al. |
| 5,781,682 A | 7/1998 | Cohen et al. |
| 5,790,733 A | 8/1998 | Smith et al. |
| 5,796,714 A | 8/1998 | Chino et al. |
| 5,812,582 A | 9/1998 | Gilliland et al. |
| 5,812,717 A | 9/1998 | Gilliland |
| 5,815,623 A | 9/1998 | Gilliland et al. |

| | | |
|---|---|---|
| 5,818,990 A | 10/1998 | Steijer et al. |
| 5,845,026 A | 12/1998 | Lee et al. |
| 5,857,047 A | 1/1999 | Strand et al. |
| 5,857,050 A | 1/1999 | Jiang et al. |
| 5,859,947 A | 1/1999 | Kiryuscheva et al. |
| 5,870,518 A | 2/1999 | Haake et al. |
| 5,879,173 A | 3/1999 | Poplawski et al. |
| 5,883,748 A | 3/1999 | Shum |
| 5,896,481 A | 4/1999 | Beranek et al. |
| 5,907,571 A | 5/1999 | Ogino et al. |
| 5,914,976 A | 6/1999 | Jayaraman et al. |
| 5,920,670 A | 7/1999 | Lee et al. |
| 5,940,562 A | 8/1999 | Henson et al. |
| 5,963,693 A | 10/1999 | Mizue et al. |
| 5,963,696 A | 10/1999 | Yoshida et al. |
| 5,980,312 A | 11/1999 | Chapman et al. |
| 5,985,185 A | 11/1999 | Steijer et al. |
| 5,987,202 A | 11/1999 | Gruenwald et al. |
| 5,997,185 A | 12/1999 | Kropp |
| 6,004,042 A | 12/1999 | Million et al. |
| 6,004,044 A | 12/1999 | Paulus et al. |
| 6,005,991 A | 12/1999 | Knasel |
| 6,012,855 A | 1/2000 | Hahn |
| 6,014,713 A | 1/2000 | Agnew et al. |
| 6,015,239 A | 1/2000 | Moore |
| 6,023,339 A | 2/2000 | Haugsjaa et al. |
| 6,028,724 A | 2/2000 | Leib |
| 6,034,808 A | 3/2000 | Isaksson |
| 6,040,624 A | 3/2000 | Chambers et al. |
| 6,048,107 A | 4/2000 | Pubanz |
| 6,056,448 A | 5/2000 | Sauter et al. |
| 6,061,493 A | 5/2000 | Gilliland et al. |
| 6,062,739 A | 5/2000 | Blake et al. |
| 6,071,015 A | 6/2000 | Erbse et al. |
| 6,071,017 A | 6/2000 | Gilliland et al. |
| 6,074,103 A | 6/2000 | Hargreaves et al. |
| 6,075,911 A | 6/2000 | Goto |
| 6,076,975 A | 6/2000 | Roth |
| 6,076,976 A | 6/2000 | Kidd |
| 6,079,881 A | 6/2000 | Roth |
| 6,081,647 A | 6/2000 | Roth et al. |
| 6,097,873 A | 8/2000 | Filas et al. |
| 6,170,996 B1 | 1/2001 | Miura et al. |
| 6,181,854 B1 | 1/2001 | Kojima et al. |
| 6,195,261 B1 | 2/2001 | Babutzka et al. |
| 6,217,231 B1 | 4/2001 | Mesaki et al. |
| 6,235,141 B1 | 5/2001 | Feldman et al. |
| 6,249,637 B1 | 6/2001 | Weigel |
| 6,250,820 B1 | 6/2001 | Melchior et al. |
| 6,305,848 B1 | 10/2001 | Gregory |
| 6,325,551 B1 | 12/2001 | Williamson III et al. |
| 6,354,747 B1 | 3/2002 | Irie et al. |
| 6,374,004 B1 * | 4/2002 | Han et al. .............. 385/14 |
| 6,396,191 B1 | 5/2002 | Hagelstein et al. |
| 6,404,792 B1 | 6/2002 | Yamamoto et al. |
| 6,411,638 B1 | 6/2002 | Johnson et al. |
| 6,461,058 B1 | 10/2002 | Birch et al. |
| 6,736,553 B1 * | 5/2004 | Stiehl et al. ............ 385/89 |
| 2004/0057677 A1 * | 3/2004 | Jacobowitz et al. ...... 385/89 |
| 2004/0109649 A1 * | 6/2004 | Mazotti et al. .......... 385/94 |

FOREIGN PATENT DOCUMENTS

| | | |
|---|---|---|
| EP | 0 607 700 A | 7/1994 |
| EP | 0 710 861 A1 | 5/1996 |
| EP | 0 790 678 A3 | 8/1997 |
| EP | 0 790 678 A2 | 8/1997 |
| EP | 0 899 592 A1 | 3/1999 |
| EP | 0 607 700 B1 | 8/1999 |
| EP | 1 028 340 | 8/2000 |
| EP | 1 028 341 A2 | 8/2000 |
| EP | 0 974 856 A2 | 11/2000 |
| EP | 0 974 856 A3 | 11/2000 |
| GB | 1 304 428 A | 1/1973 |
| JP | 56 046573 | 4/1981 |
| JP | 56 079468 | 6/1981 |
| JP | 56 111822 | 9/1981 |
| JP | 60 156023 | 8/1985 |
| JP | 01 073304 | 3/1989 |
| JP | 05 102529 | 4/1993 |
| JP | 08 082724 | 3/1996 |
| JP | 09 043456 | 2/1997 |
| JP | 09 061683 | 3/1997 |
| JP | 09 197197 | 7/1997 |
| JP | 10 186162 | 7/1998 |
| JP | 10 126002 | 8/1998 |
| JP | 10 239569 | 9/1998 |
| JP | 10 197751 | 10/1998 |
| WO | WO 97 25638 A3 | 7/1997 |
| WO | WO 97 25641 A3 | 7/1997 |
| WO | WO 98 31080 | 7/1998 |
| WO | WO 99 39230 | 8/1999 |
| WO | WO 00/13051 A1 | 3/2000 |
| WO | WO 00/46623 | 8/2000 |
| WO | WO 00/73833 A1 | 12/2000 |

OTHER PUBLICATIONS

Robinson et al.; Low Cost Molded Packaging for Optical Data Links;1 1994 IEEE Journal; pp. 312–316.

Buckman, et al., Parallel Optical Interconnects , Proc. Hot Interconnects VI, Stanford, CA, USA, Aug. 13–15, 1998, pp. 137–143.

Rosenburg, et al., The PONI–1 Parallel–Optical Link, $49^{th}$ Electronic Components & Technology Conference, San Diego, CA, Jun. 1–4, 1999, pp. 763–769.

Giboney et al., The PONI Optoelectronic Platform, IEEE Lasers and Electro–Optics Society 1999 Annual Meeting, San Francisco, CA Nov. 8–9, 1999, pp. 25–26.

Buckman, et al., Parallel Optical Interconnects, Conference on Lasers and Electro–Optics, San Francisco, CA May 11, 2000, pp. 1–3.

Nagahori, et al., 1–Gbyte/sec Array Transmitter and Receiver Modules for Low–Cost Optical Fiber Interconnection, 996 Electronic Components & Technology Conference, $46^{th}$ Proceedings, pp. 255–258.

Niburg et al., A Complete Sub–System of Parallel Optical Interconnects for T Iecom Applications, 1996 Electronic Components & Technology Conference, $46^{th}$ Proceedings, pp. 259–263.

de Pestel et al., Parallel Optical Interconnections for Future Broad Band Systems, Based on the "Fiber in Board Technology", 1996 Electronic Components & Technology Conference, $46^{th}$ Proceedings, pp. 264–266.

Wong et al., Opt Electronic Technology Consortuim (OETC) Parallel Optical Data Link: Components, System Applications and Simulation Tools, 1996 Electronic Components & Technology Conference, $46^{th}$ Proceedings, pp. 269–278.

Lebby et al., Characteristics of VCSEL Arrays for Parallel Optical Interconnects, 1996 Electronic Components & Technology Conference, $46^{th}$ Proceedings, pp. 279–291.

Crow et al., The Jitney Parallel Optical Interconnect, 1996 Electronic Components & Technology Conference, $46^{th}$ Proceedings, pp. 292–300.

Hahn et al., Gigabyte/sec Data Communications with the POLO Parallel Optical Link, 1996 Electronic Components & Technology Conference, 46$^{th}$ Proceedings, pp. 301–307.

Liu et al., Polymer Optical Interconnect Technology (POINT)—Optoelectroic Packaging and Interconnect for Board and Backplane Applications, 1996 Electronic Components & Technology Conference, 46$^{th}$ Proceedings, pp. 308–315.

Swirhun et al., The P–VixeLink™ Multichannel Optical Interconnect, 1996 Electronic Components & Technology Conference, 46$^{th}$ Proceedings, pp. 316–320.

Carson et al., Low–Power Modular Parallel Photonic Data Links, 1996 Electronic Components & Technology Conference, 46$^{th}$ Proceedings, pp. 321–326.

* cited by examiner

METHOD AND APPARATUS FOR PARALLEL OPTICAL TRANSCEIVER MODULE ASSEMBLY

FIELD OF THE INVENTION

The present invention relates to the field of network communications. More specifically, the present invention relates to a parallel optical transmitter, receiver or transceiver module.

BACKGROUND

Optical fibers are one of the most important new media for modern communication to provide very high speed, long-span transmission of information. The fiber optics industry has exploded as the Internet and telecommunication field have created a skyrocketing demand for broadband, high-speed pipelines to carry data. Long-span fiber optic networks of a few hundred kilometers carrying bandwidth ranging from 40 to 50 gigabit per second have been widely deployed. Also, fiber optics plays a very important role in connecting local area networks of 500 meters to 2 kilometers, such as connecting one building to another building. The largest growth area for high-speed fiber optics, however, is connecting distances of less than 300 meters for a wide variety of purposes, including connecting computers within a room and linking routers, switches, and transport equipment. In this sub-300 meter or short-distance market, it is more economical to utilize a parallel fiber optic link to meet the ever-increasing transmission bandwidth requirements. The parallel fiber optic link typically involves a fiber ribbon cable with multiple fibers that connects a multi-channel optical transmitter and a multi-channel optical receiver, also known as parallel optical transmitter and receiver.

A critical aspect of manufacturing low cost, easy-to-use and efficient (i.e., low loss of light) parallel optical transmitter and receiver modules is to package the optoelectronic array devices that transmit and receive light streams to and from the optical fibers. Optoelectronic devices are sensitive and/or susceptible to temperature, humidity, and other environmental hazards due to the complexity and fabrication limits of these devices, which contribute to majority of the failure in the transmitter and receiver modules. In the current design of parallel optical transmitter and receiver, however, the optoelectronic array devices can be typically tested after the whole module is assembled. This causes the difficulty of rework, very high material cost if the part fails, and lack of effective in-line process diagnostic techniques during manufacture. Moreover, the burn-in process, which stabilizes the array device performance and screens out "infant failures," is usually conducted at the module level, which requires more complex test setup and longer burn-in time, and further increases the manufacturing cost.

Accordingly, there is a need in the art to improve reliability of the parallel optical transmitter/receiver modules by using a hermetically or near-hermetically packaged optoelectronic device. In addition, there is a need to provide a more efficient method to manufacture optical transceiver, transmitter, and/or receiver modules so that the method and apparatus are suitable for mass production.

SUMMARY OF THE INVENTION

In view of the above-stated disadvantages of the prior art, an object of the present invention is to provide a modular processing method to manufacture parallel optical transmitter, receiver and/or transceiver modules to improve the yield of the modules in the manufacture process.

Another object of the present invention is to provide an apparatus and process for aligning and connecting at least one optical fiber to at least one optoelectronic device.

Another object of the present invention is to provide an apparatus and method for packaging an array of optoelectronic devices to improve reliability of the devices.

In accordance with one object of the present invention, this invention discloses an array optical subassembly. In one embodiment, the array optical subassembly includes an optoelectronic array package and optical lens array. Optoelectronic array package, in one aspect, further includes an array header, array of optoelectronic devices and window cap. The array header is made of ceramic and is designed to house optoelectronic devices. A function of the array header is to facilitate data communication between optoelectronic devices and a printed circuit board, which may host a group of electronic components for digital signal processing. Another function of the array header is to provide physical support to optoelectronic devices. In yet another function of the array header is to facilitate alignment between optoelectronic devices and optical fibers.

Optoelectronic array device may include an array or multiple sets of array of semiconductor lasers and/or photodectors, such as vertical cavity emitting-surface lasers ("VCESLs"), photodiodes and a combination of VCSELs and photodiodes. In one embodiment, the optoelectronic array device is coupled to the array header and facilitates optical communication in response to various electrical signals. The window cap, in one embodiment, includes a window lid, which is transparent or partially transparent, and walls that extend from the window lid. The window lid may be made of glass and the walls may be made of alloy material. In one embodiment, the window cap is sealed to the array header to provide a hermetically or near-hermetically sealed environment for the optoelectronic devices to resist potential corrosions and/or damages from humidity and/or other environmental hazards. In another embodiment, the window lid can be directly attached with the array header without using the metal walls.

Optical lens array, in one embodiment, includes a micro lens array, which includes a group of spherical or non-spherical shaped lenses, either refractive or diffractive. A primary function of optical lens array is to focus divergent optical beams for efficient coupling between optical fibers and the optoelectronic array device.

In accordance with another object of the present invention, this invention discloses a method of modular process for manufacturing optical modules such as transceivers, transmitters and/or receivers. In one embodiment, the modular process assembles an array of optoelectronic devices to an array header to form an optoelectronic array package. Once the optoelectronic array package is assembled, it is tested to verify the functionality and then subjected to a burn-in process. The functionality test ensures that each optoelectronic device still performs normally after the assembly process, while the burn-in process stabilizes the optoelectronic device and finds out early device failures. Defective optoelectronic devices may be identified and removed during the test. The optoelectronic array package is subsequently coupled with an optical lens array to form an array optical subassembly. After the array optical subassembly is again tested and verified, it is connected to a printed circuit board that houses electronic devices for signal processing, then coupled to a standard fiber connector, such as MPO housing to form a transmitter, receiver, or transceiver module. The assembly and testing of array optical sub-assembly and printed circuit board can be conducted separately during manufacturing, allowing them to be processed in parallel and therefore improve the manufacturing efficiency.

Additional features and benefits of the present invention will become apparent from the detailed description, figures and claims set forth below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

An apparatus and method for manufacturing a parallel optical module, such as a transceiver, transmitter or receiver, using a modular process and hermetically or near-hermetically sealed optoelectronic array devices are discussed.

In the following description, for purposes of explanation, numerous specific details are set forth to provide a thorough understanding of the present invention. It will be apparent, however, to one skilled in the art that these specific details may not be required to practice the present invention. In other instances, well-known circuits and devices are shown in block diagram form to avoid obscuring the present invention.

It is understood that the present invention may contain transistor circuits that are readily manufacturable using well-known art, such as for example CMOS ("complementary metal-oxide semiconductor") technology, or other semiconductor manufacturing processes. In addition, the present invention may be implemented with other manufacturing processes for making digital devices.

Modular process and apparatus for manufacturing an optical transmitter, receiver and/or transceiver are discussed. In one embodiment, the modular process assembles an array of optoelectronic devices onto an array header to form an optoelectronic array package. Optoelectronic array package is subsequently tested to verify its functionality and burned-in for performance stabilization. After verification, optoelectronic array package is coupled with an optical lens array to form an array optical subassembly ("OSA"). A parallel optical module is assembled when an OSA is coupled with a printed circuit board. It should be noted that the terms an optical module, parallel optical module, optical transmitter, optical receiver, and optical transceiver will be used interchangeably herein.

The OSA, in one embodiment, further includes a window cap, which provides a sealed, hermetically sealed, or near-hermetically sealed environment for an optoelectronic array device. The sealed environment improves the reliability of an optoelectronic array device because it prevents hazards, such as humidity and/or chemical agents from reaching the optoelectronic array device. It should be noted that the terms sealed, hermetically sealed and near-hermetically sealed could be used interchangeably herein.

Figure 1:
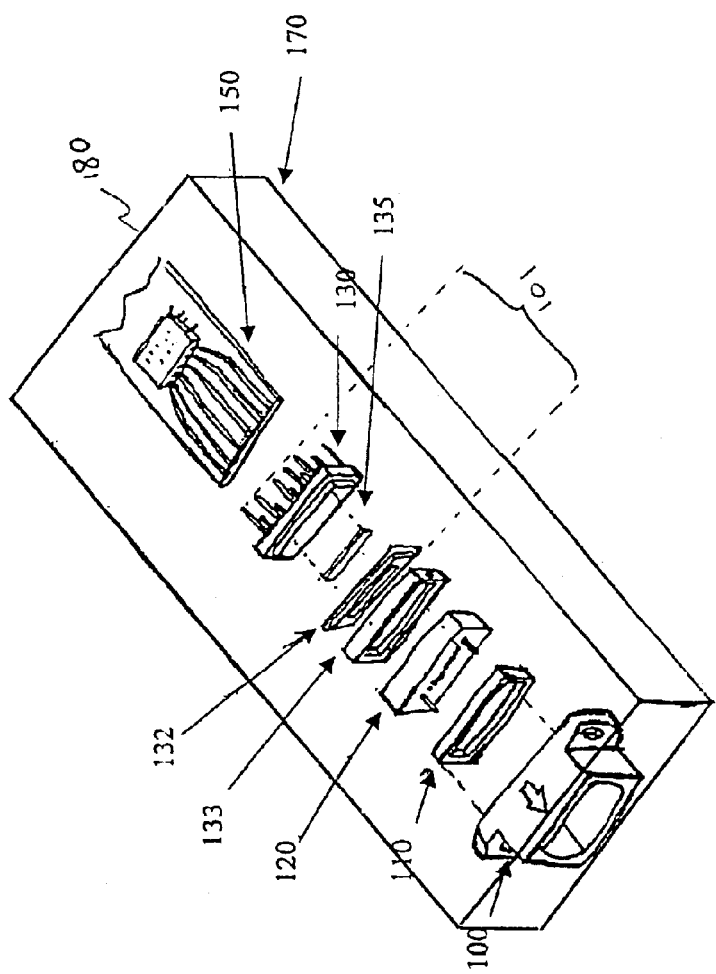
FIG. 1 is a block diagram illustrating a parallel optical module in accordance with one embodiment of the present invention.

FIG. 1 is a block diagram illustrating a parallel optical module 170 in accordance with one embodiment of the present invention. Parallel optical module 170, also known as parallel optical transmitter/receiver, may be a transmitter, receiver and/or transceiver. Parallel optical module 170 includes an array OSA, fiber connector 100 and printed circuit board 150. The array OSA, in one embodiment, includes an optical lens array 120 and optoelectronic array package 101, which further contains a window cap 132, optoelectronic array device 135 and array header 130. Parallel optical module 170 further includes a mechanical support and mounting assembly (MSMA) 180, which, in one aspect, functions as a heat sink for dissipating heat generated by optoelectronic array device 135.

Optoelectronic array device 135, in one embodiment, includes an array of optoelectronic devices for high-speed optical data communication. The array of optoelectronic devices may be an array of vertical cavity surface-emitting lasers ("VCSELs"), light emitting diodes ("LEDs"), photodetectors or a combination of semiconductor lasers and photodetectors. The array of VCSELs, in one aspect, converts electrical power into optical power that may be used in parallel fiber optic communication systems or other light wave applications. The array of photodetectors may include an array of positive-intrinsic-negative ("PIN") photodiodes or metal-semiconductor-metal ("MSM") photodiodes, or resonant cavity photodiodes (RC-PD). A primary function of a photodetector is to convert optical power into electrical power for fiber optic communication applications. It should be noted that it does not depart from the scope of the present invention if additional components, not shown in FIG. 1, are added or subtracted.

In another embodiment, optoelectronic array package 101, further includes an optical lens array as a part of package. The manufacturing steps include attaching the optical lens array to the optoelectronic array package 101 to form an array optical subassembly (OSA) using optical alignment. The alignment involves aligning an array of optoelectronic devices 135 with respect to optical fibers through the optical lens 120. The alignment procedure may involve active, passive and/or both active and passive alignments.

Accurate assembly and alignment of various components within optoelectronic array package 101 are essential to achieving a high-performance optical module 170. In one embodiment, a modular assembling process includes steps of assembling optoelectronic array packages 101 as independent modules and verifying these modules before they are being assembled into final products as such optical modules 170. Tests being conducted during the modular process include functionality, alignment and reliability tests. Reliability test, in one embodiment, includes a burn-in test, which is intended to remove defective devices by running every optoelectronic device for an extended period of time.

Alignment process includes aligning each optoelectronic device with respect to each associated optical fiber to maximize the optical coupling. Active alignment generally involves steps of inserting optical fibers or a fiber ribbon cable into optical module 170 while connecting other ends of optical fibers or the other end of the fiber ribbon cable to an optical power meter or an array of light sources, depending upon whether it is for transmitter or receiver alignment. After the VCSEL and/or photodiode devices are turned on, the optoelectronic array device 101 are adjusted in X, Y, Z, and theta dimension to optimize the coupling between the optical fibers and optoelectronic array device 101 through the lens array 120. Another embodiment of alignment involves passive alignment technology. Passive alignment relies on imaging technology that utilizes visual or machine vision to recognize location and size of fiducial or other features on the optoelectronic array device through the lens array 120.

Optical connector 100, in one embodiment, performs similar functions as commonly known fiber connector, fiber ribbon cable connector or optical housing. Optical fibers may be directly inserted into optical connector 100 to facilitate optical communication between optoelectronic array package 101 and optical fiber. Optical connector 100, in one embodiment, is capable of coupling to groups of optical fibers simultaneously. For example, groups of optical fibers may contain two sets of twelve optical fibers wherein a group or set of twelve optical fibers is dedicated to sending optical signals while another set of twelve optical fibers is dedicated to receiving optical signals. Fiber connector 100, in one embodiment, is a commercially standard off-the-shelf cable connector, such as MPO or MTP fiber connector.

Optical lens array 120 includes a micro lens array and register features such as pins or holes, which may be used for coupling between optical lens array 120 and optical connector 100. The register features of lens array 120, in one embodiment, are used to align optical lens array 120 with respect to optoelectronic array device 135 and optical fibers. As mentioned earlier, a function of optical lens array 120 is to focus divergent optical beams, which could either come from optoelectronic array device 135 or optical fibers, for more efficiently coupling between optical fibers 22 and optoelectronic array device 135. In general, the terms optical signal, optical light, optical beam, optical data, optical radiation, and optical power can be used interchangeably herein.

A primary function of optical lens array 120 is to focus light between the optoelectronic devices and fibers. In one embodiment, it consists of micro lenses with spherical or non-spherical shaped surfaces, either refractive or diffractive. The optical lens is made of injection-mold plastics, or optical glass, or semiconductor materials. In another embodiment, the lens array is graded-index (GRIN) lens.

In one embodiment, an adapter ring 110 or retainer is inserted between optical lens array 120 and optical connector 100 for more efficiently coupling between lens array 120 and optical connector 100. In some occasions, adding various adapter rings 110 are necessary steps to use off-the-shelf commercially available standard optical parts. It should be noted that terms adapter ring, adapter, or retainer can be used interchangeably herein.

Array header 130 provides physical and electrical support for optoelectronic array device 135. A primary function of array header 130 is to facilitate data communication between printed circuit board 150 and optoelectronic array devices 135. In one embodiment, array header 130 is made of ceramic material, which is a desirable material with superior microwave and thermal performance. In another embodiment, the array header is made of organic dielectric material such as industry standard FR-4 or Roger material for printed-circuit board (PCB). Metal walls are brazed or soldered on the header to facilitate hermetic sealing. In yet another embodiment, the walls are made of the same materials of the header. Optoelectronic array device 135 is mounted on array header 130 via various attaching methods, for example, soldering, wire bonding, epoxy, and/or flip-chip bonding. After the process of attaching an optoelectronic array device 135 to an array header 130, the functionality and alignment of each optoelectronic device are verified through device testing. Another function of array header 130 is to provide structural support for optoelectronic array device 135.

Window cap 132 is coupled to array header 130 for creating a chamber to encapsulate optoelectronic array device 135. A function of window cap 132 is to provide physical protection to optoelectronic array device 135. Window cap 132 may contain multiple pieces including window lid and walls extended from the lid for creating a hermetically sealed chamber. In another embodiment, window cap 132 is a single piece component such as a flat glass or plastic window or a metal plate with an opening filled with glass.

Printed circuit board 150, in one embodiment, is a flexible printed circuit board, which is physically flexible. For example, flexible printed circuit board 150 may be designed to bend from 0 to 90 degrees without affecting the electrical signal integrity. Flexible printed circuit board 150 is thin, rectangular and flexible with various edge contours, and it is composed of flexible metal layers that are sandwiched between insulating layers. The entire flexible printed circuit board 150 may be composed of this multi-layered structure. Printed circuit board 150 may include additional integrated circuits, such as laser diode driver, amplifier, power regulator, et cetera. The array OSA and printed circuit board 150, in one embodiment, are enclosed and/or mounted within MSMA 170.

Electrical circuit board 150, in another embodiment, is a rigid printed circuit board. In this embodiment, optoelectronic array package 101 is capable of mounting on the edge of the rigid printed circuit board using edge-mounting techniques, also known as "corner turn" or "side-way mounting" techniques. An advantage of using the edge connection is to improve optical interface between optoelectronic devices and optical fibers because the edge connection causes optical beams to be in substantial parallel with printed circuit board 150. It should be apparent to one skilled in the art that it does not depart from the scope of the present invention if an alternative structure or circuitry elements are used.

When the optoelectronic devices function as emitters for emitting optical signals into optical fibers, they may be semiconductor lasers such as vertical cavity surface emitting lasers. If the optoelectronic devices function as receivers for receiving optical signals from optical fibers, they may be photodetectors formed on a semiconductor chip. The driver chip modulates and drives the optoelectronic devices, and the amplifier amplifies the signal received from the photodetectors arrays. An attenuator may improve the performance of the optoelectronic devices by attenuating the optical energy emitted from the devices. Similarly, a conditioner may improve the performance of the optical fibers by conditioning the launch of the optical energy into the fibers.

In operation, printed circuit board 150 provides electrical signals to array header 130. If optoelectronic array device 135 contains an array of VCSELS, it converts electrical signals to optical signals and emits optical signals to optical lens array 120 through window cap 132. Optical lens array 120 focuses light beams from optoelectronic array device 135 to optical fibers via optical fiber connector 100.

During the modular manufacturing process, optoelectronic array package 101 is assembled through coupling an optoelectronic array device 135 to an array header 130 and then optoelectronic array device 135 is encapsulated in a window cap 132. Upon testing the functionality and conducting a burn-in process for optoelectronic devices, optoelectronic array package 101 is further coupled to an optical lens array 120 to form an array OSA. Additional adapter rings or retainers may be added between optoelectronic array package 101 and optical lens array 120 to maximize the optical coupling. Once the array OSA is tested and verified, it is further mounted to a printed circuit board 150 to form a parallel optical module 170. An advantage of modular assembling process is to allow manufacturing modules, such as optoelectronic array package 101, at different time and location than manufacturing final products, such as optical modules 170.

Furthermore, optoelectronic device burn-in is conducted at the array package level instead of at the final product level, reducing the burn-in time and complicated equipment required for final product level burn-in. Another advantage of modular assembling process is to shorten the time required to manufacture optical modules because various modules can be assembled and tested in parallel. Another advantage of modular assembling process is to remove defective optoelectronic devices before they are being assembled into optical modules 170 through various testing procedures, such as the burn-in process.

Figure 2:
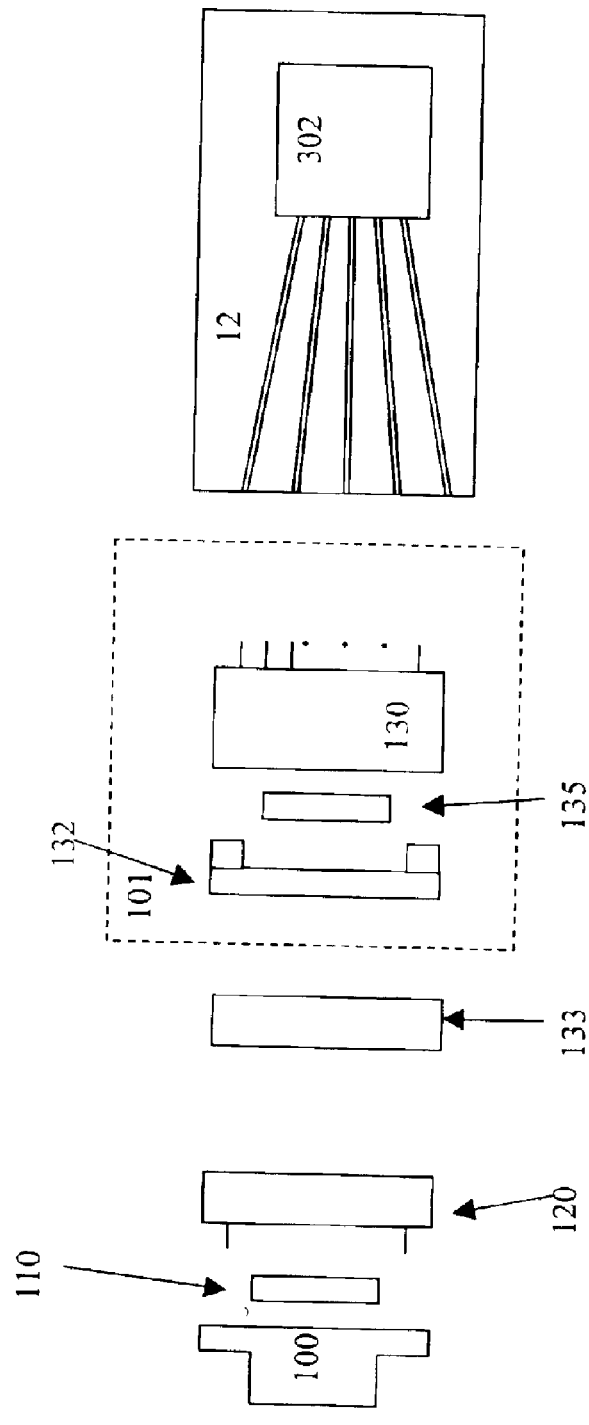
FIG. 2 is a block diagram of a parallel optical module illustrating a modular manufacturing process in accordance with one embodiment of the present invention.

FIG. 2 is a block diagram of optical module 200 illustrating a modular process in accordance with one embodiment of the present invention. Referring to FIG. 2, optical module 200 includes an optoelectronic array package 101, optical lens array 120, optical fiber connector 100 and a printed circuit board 12. In one embodiment, optoelectronic array package 101 includes an array header 130, optoelectronic array device 135 and window cap. Printed circuit board 12 may further include driver integrated circuit 302 and metal traces for electrical communications. It should be obvious to one skilled in the art that it is within the scope of the present invention if additional blocks and circuits are added to or subtracted from optical module 200.

In one embodiment, optoelectronic array package 101 and printed circuit board 12 are manufactured through a modular manufacturing process. Modular manufacturing process may manufacture various modules, such as optoelectronic array package 101 and printed circuit board 12, independently. Modules can be made at different times and locations. Each module is thoroughly tested and verified before it is being assembled into a final device. For example, printed circuit board 12, optoelectronic array package 101 and optical lens array 120 are assembled and tested independently before they are being assembled into optical module 170.

During the modular manufacturing process, an optoelectronic array device 135 is first mounted on an array header 130. In one embodiment, array header 130 having a mounted optoelectronic array device 135 is tested to verify that the mounting process did not cause the optoelectronic devices to fail. Once the functionality of every optoelectronic device is verified, a window cap 132 is mounted on array header 130 covering optoelectronic array device 135. After window cap 132 is attached, an optoelectronic array package 101 is formed.

In another embodiment, optoelectronic array package 101 further includes an optical lens array 120. In this embodiment, an adapter ring 133 or multiple adapters may be inserted between optical lens array 120 and window cap 132. It, should be apparent to one skilled in the art that adapter ring 133 can be removed or added depending on the nature of the design and commercially available optical parts. Once optoelectronic array package 101 is assembled, it is tested and aligned before it is further assembled to printed circuit board 12. The test may include functionality and alignment test between optical fibers and optoelectronic array device 135. Defective optoelectronic array package 101 may be identified and removed during the test.

An advantage of employing the modular assembly or modular manufacturing process is to reduce "infant mortality" of optoelectronic devices through the test and burn-in process of the optoelectronic array package since the optoelectronic devices tend to be more likely to fail than other components in optical module 300. Another advantage of using the modular process is to allow various modules to be manufactured in parallel, which increases turnaround time through outsourcing at the same time lowering manufacturing cost. In yet another advantage of using the modular process is to allow modules or subassemblies to be tested individually, which increases yield and decreases overall cost of manufacture. Extensive subassembly tests during the modular construction process reduce tests needed to be performed on final products such as optical modules 300. A further advantage of modular construction process is to enable independent redesigning or improving individual module or subassembly without redesigning the entire optical module 300.

Figure 3:
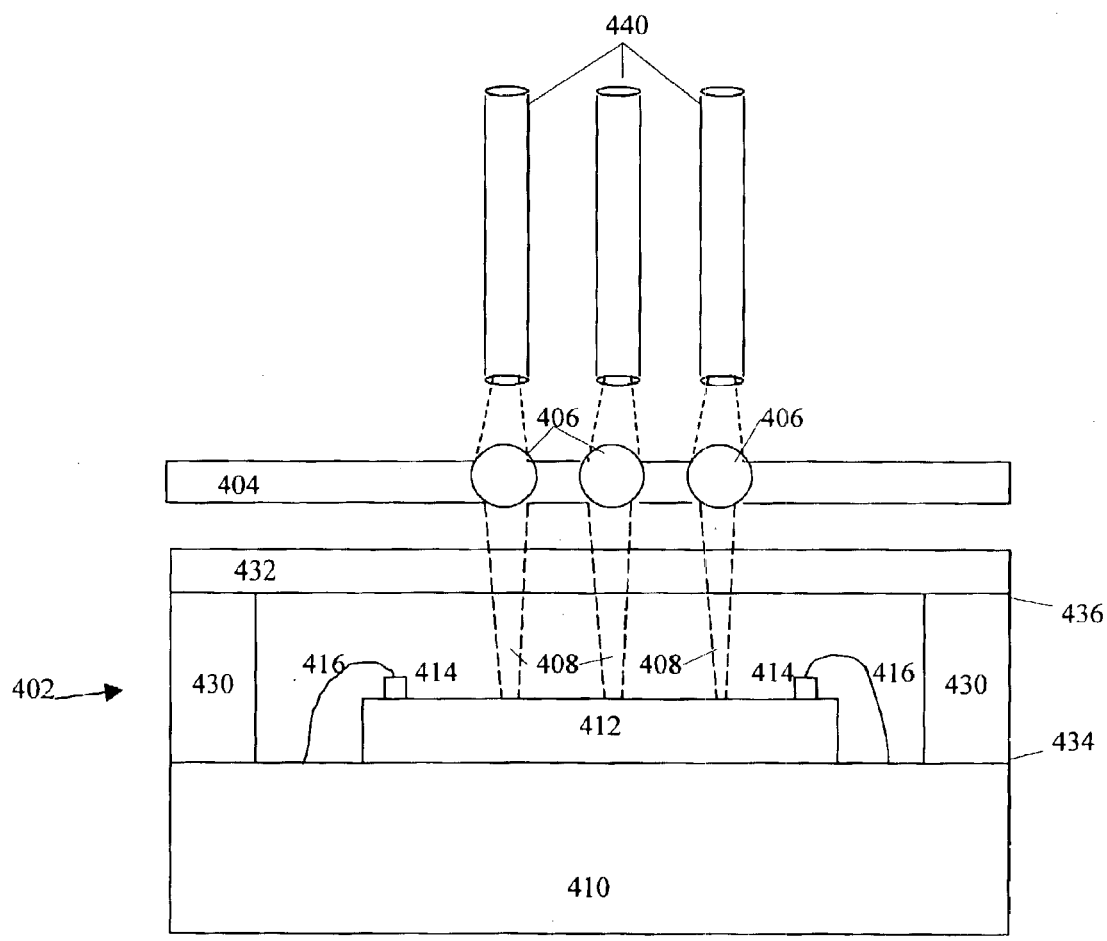
FIG. 3 is a block diagram illustrating a hermetically sealed optoelectronic array device in accordance with one embodiment of the present invention.

FIG. 3 is a block diagram 300 illustrating a hermetically or near-hermetic scaled optoelectronic array device 402 in accordance with one embodiment of the present invention. Block diagram 400 includes an optoelectronic array package 402, optical lens array 404 and a set of optical fibers 440. Optical fibers 440 transport optical signals or information between optoelectronic array package 402 and the destination or origin of optical signals, which could be another system located miles away. In one embodiment, optical lens array 404 includes various spherical or non-spherical transparent objects 406 that are used as lenses to focus optical beams 408 for maximizing optical coupling. It should be noted that lens array 404 might contain various lenses 406 according to the number of optical beams 408 that it needs to focus.

Optoelectronic array package 402, in one embodiment, includes an array header 410, optoelectronic array device 412, walls 430 and window lid 432. Array header 410 may be made of single or multi-layered ceramic materials. In another embodiment, array header 410 is made of ceramic material but also with metal enclosures attached to it for sealing purpose. In yet another embodiment, array header 410 is made of organic dielectric material such as materials used for PCBs. Array header 410 further includes metal pads for die contacts. In one embodiment, array header 410 includes various layers of metal traces for electrical routing. A function of array header 410 is to provide electrical current to optoelectronic array device 412. Another function of array header 410 is to provide physical support to optoelectronic array device 412.

Optoelectronic array device 412 includes an array of VCSELs, LEDs, photodiodes or a combination of VCSELs, LEDs, and photodiodes. For example, an optoelectronic array device 412 may include twelve VCSELs. Also, optoelectronic array device 412 may include twelve VCSELs and twelve photodiodes. Moreover, optoelectronic array device 412 may alternatively include twelve photodiodes. Optoelectronic array device 412, in one embodiment, further includes various contact pads 414, which facilitate direct connections to various locations via bonding wires 416.

Various coupling techniques are used to attach optoelectronic array device 412 to array header 410. In one embodiment, epoxy is used to couple optoelectronic array device 412 to array header 410. Eutectic solution or alloy, in another embodiment, is used to solder optoelectronic array device 412 to array header 410. In yet another embodiment, solder-bumping method using flip-chip processing technique is employed to join optoelectronic array device 412 to array header 410.

Referring to FIG. 3, optoelectronic array package 402 further contains a window cap, which includes a window lid 432 and multiple walls 430. Walls 430, in one embodiment, are structured around optoelectronic array device 412 on the surface of array header 410. In this embodiment, bottom portions 434 of walls 430 are coupled to array header 410 while the top or up portions 436 of walls 430 are coupled to window lid 432. Window lid 432 is made of transparent material thereby optical beams 408 can pass through window lid 432 with minimal loss. In another embodiment, window lid 432 is made of semi-transparent material. In one embodiment, walls 430 are part of window lid 432.

To provide protection to optoelectronic array device 412, window cap and array header 410 creates a chamber to encapsulate optoelectronic array device 412. The chamber for optoelectronic array device 412, in one embodiment, is hermetically sealed. In another embodiment, the chamber encapsulating optoelectronic array device 412 is near-hermetically sealed.

In operation, when optoelectronic array device 412 is a transmitter, it converts electrical current supplied from array header 410 to optical beams 408. Optical beams 408 are emitted from semiconductor lasers such as VCSELs. Upon passing through window lid 432, optical beams 408 reach to optical lens array 404. Optical beams 408 are focused through the lenses and subsequently coupled into the optical fibers 440. On the other hand, if optoelectronic array device 412 is a receiver, it converts optical beams 408 to electrical current. Optical fibers 440 transport or direct optical beams 408 to optical lens array 404. Optical lens array 404 focuses optical beams 408 and forwards focused optical beams 408 to photodiodes 412. Photodiodes 412 generates electrical signals in response to optical beams 408 detected. When photodiode 412 outputs electrical signals to array header 410, array header 410 forwarded the electrical signals to their destination(s) via the printed circuit board.

An advantage of using a sealed optoelectronic component is to enhance the 85/85 humidity performances. The 85/85 humidity test is to verify the performance, functionality and reliability under an environment of 85° in Celsius and in 85% relative humidity. It should be noted that it does not depart from the present invention if additional circuits are added to or subtracted from block diagram 300.

Figure 4:
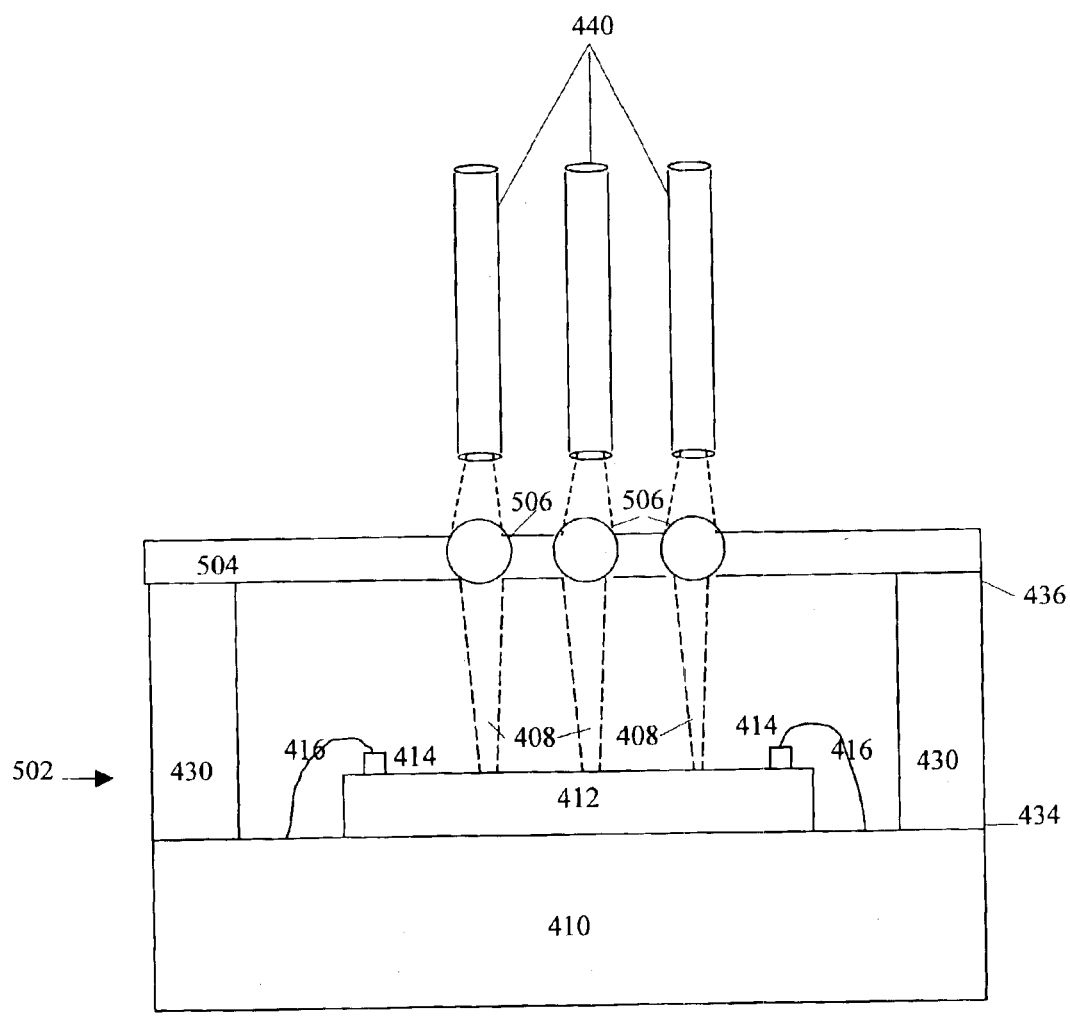
FIG. 4 is a block diagram illustrating a hermetically sealed optoelectronic array device wherein the lens array is part of the optoelectronic array package in accordance with one embodiment of the present invention.

FIG. 4 is a block diagram 400 illustrating a sealed optical device wherein optical lens array 504 is part of optoelectronic array package 502 in accordance with one embodiment of the present invention. Block diagram 500 includes an optoelectronic array package 502 and optical fibers 440. Optical fibers 440 transmit optical signals 408 or information between optoelectronic array package 502 and the destination of optical signals 408.

Optoelectronic array package 502, in one embodiment, includes an array header 410, optoelectronic array device 412 and an optical lens array that also functions as the window cap. Multiple walls 430, in one embodiment, are structured around optoelectronic array device 412 on the surface of array header 410. Walls 430 include bottom portions 434 and top portions 434. Bottom portions 434 are coupled to array header 410 while top portions 436 are coupled to the optical lens array or window lid 504. Optical lens array 504, array header 410 and walls 434 create a chamber for optoelectronic array device 412.

In operation, when optoelectronic array device 412 includes an array of VCSELs, it converts electrical signals supplied from array header 410 to optical beams 408. When optical beams 408 generated by the VCSELs reach Optical lens array 504, Optical lens array 504 focuses optical beams 408 and passes onto optical fibers 440 which subsequently transport the optical beams 408 to their destinations.

When optoelectronic array device 412 includes an array of photodiodes, it converts optical beams 408 to electrical signals. Optical fibers 440 transport optical beams 408 to optical lens array 504 or window lid. Window lid 504 uses various lenses to focus optical beams 408 from optical fibers 440 for maximizing optical coupling. Focused optical beams 408 are subsequently passed to optoelectronic array device 412. Upon detecting optical beams 408, optoelectronic array device 412 generates electrical signals in response to optical signals 408 detected. Electrical signals are subsequently transported by array header 410.

It should be noted that it does not depart from the present invention if additional circuits are added to or subtracted from block diagram 500.

Figure 5:
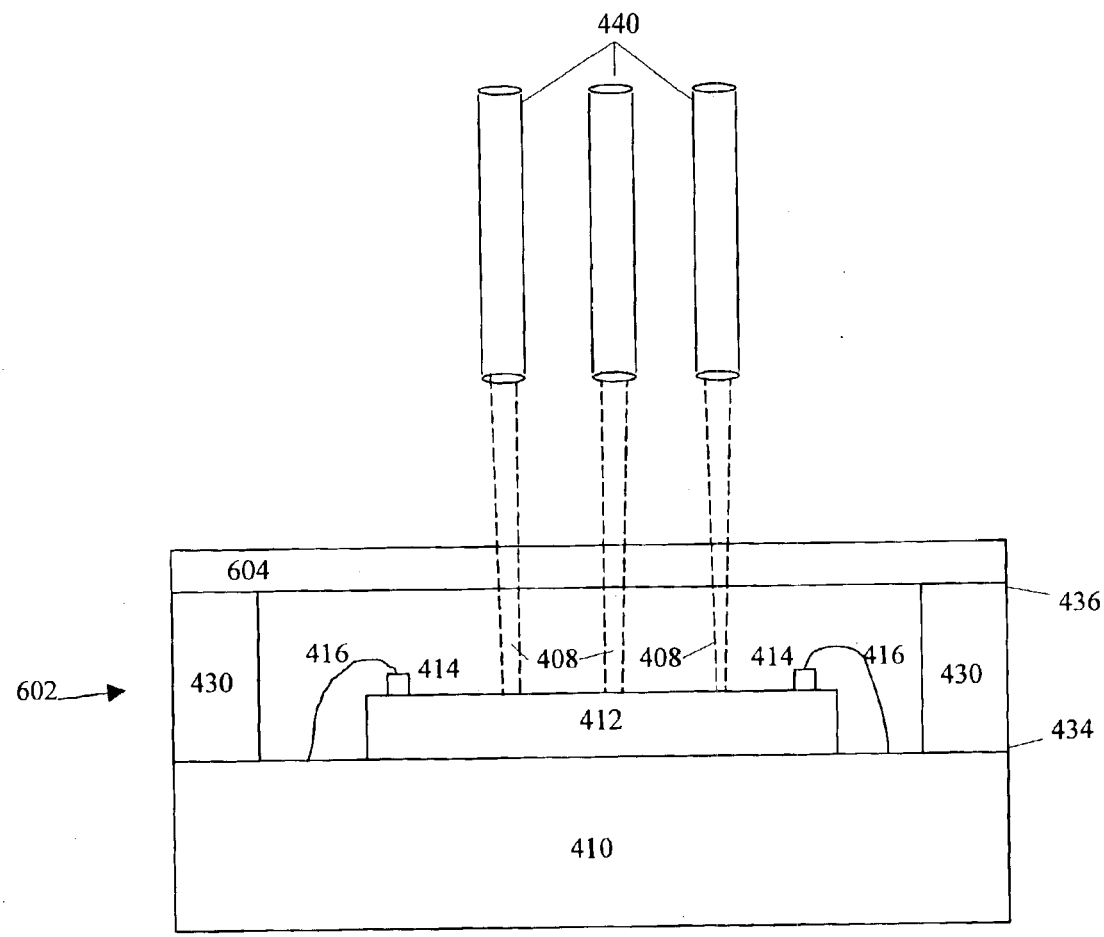
FIG. 5 is a block diagram illustrating a hermetically sealed optoelectronic array device without the use of lens array in accordance with one embodiment of the present invention.

FIG. 5 is a block diagram 500 illustrating a sealed optoelectronic array package 602 without use of lens array in accordance with one embodiment of the present invention. Block diagram 500 includes an optoelectronic array package 602 and optical fibers 440.

Optoelectronic array package 602, in one embodiment, includes an array header 410, optoelectronic array device 412 and window cap. Window cap further includes a plurality of walls 430 and window lid 604. Four walls 430 are structured around optoelectronic array device 412 on array header 410. Walls 430, in one embodiment, include bottom portion 434 and top portion 436. Bottom portion 434 are coupled to array header 410 while top portion 436 are coupled to window lid 604. Window lid 604 and array header 410 creates a chamber for optoelectronic array device 412. Optical fibers 440 are placed closely to the optoelectronic array device to allow the beam 408 directly coupled into the optical fibers, so called butt-coupled technology.

In operation, when optoelectronic array device 412 includes an array of VCSELs, it converts electrical signals to optical beams 408. Optical beams 408 are generated by the array of VCSELS. In one embodiment, optical beams 408 pass through window lid 604 and reach optical fibers 440. Optical fibers 440 subsequently transport optical beams 408 to their destinations. When optoelectronic array device 412 includes an array of photodiodes, it converts optical power to electrical power. Optical fibers 440 transport an array of optical beams 408 from an external source to the array of photodiodes. Photodiodes detect optical beams 408 and converts optical signals to electrical signals.

It should be noted that it does not depart from the present invention if additional circuits are added to or subtracted from block diagram 500.

Figure 6:
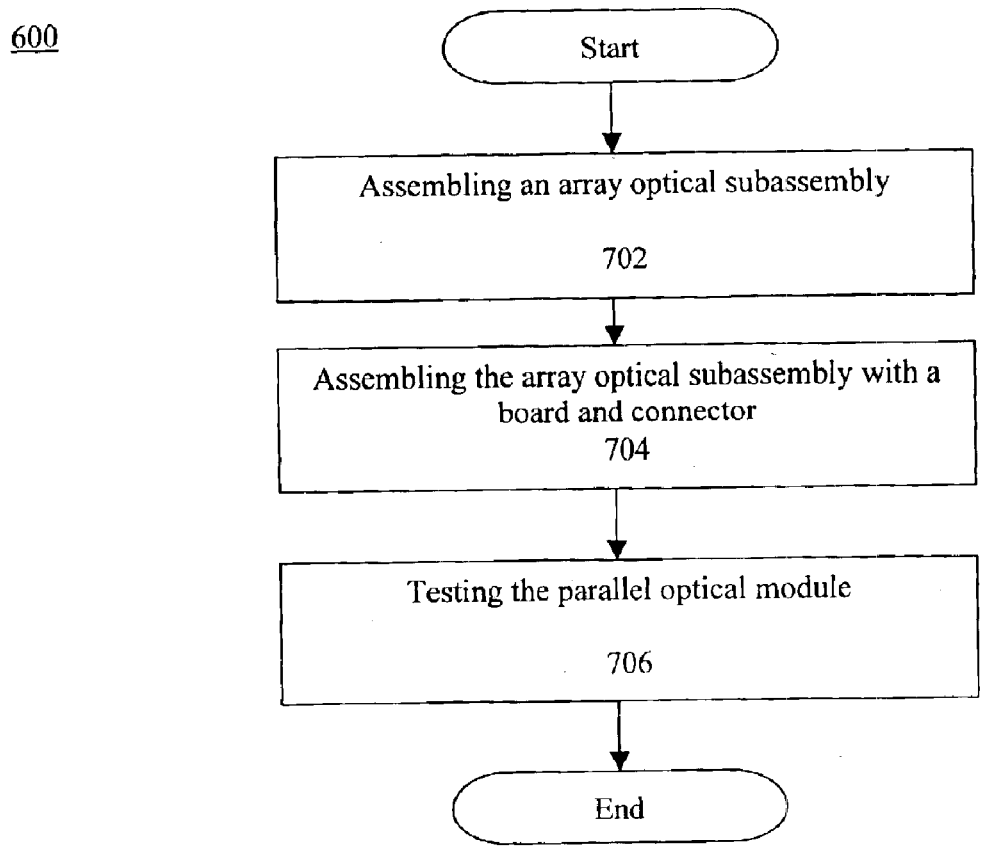
FIG. 6 is a flow chart illustrating a method of manufacturing a modular assembly of a parallel optical module in accordance with one embodiment of the present invention.

FIG. 6 is a flow chart 600 illustrating a method of modular manufacturing process for assembly optical modules in accordance with one embodiment of the present invention. At block 702, the process assembles an OSA including steps of attaching an optoelectronic array device to an array header. In one embodiment, the process assembles the optoelectronic array package by attaching an array of optoelectronic devices to an array header. In another embodiment, the process employs a window cap to cover the optoelectronic array device for providing protection to optoelectronic array device. Window cap may also be used to create a hermetically or near-hermetically sealed environment for optoelectronic devices. Once optoelectronic array package is assembled, its functionality and alignment are tested and verified. After optoelectronic array package is coupled with optical lens array, the process proceeds to block 704.

At block 704, the process attaches the OSA to an electronic circuit board and a fiber connector to create an optical module. In one embodiment, the electronic circuit board is a flexible printed circuit board. In another embodiment, the electronic circuit board is a rigid printed circuit board. After the optical module is assembled, the process proceeds to block 706.

At block 706, the process tests the optical module to verify its functionality as well as its alignment before it becomes a part of a final device.

Figure 7:
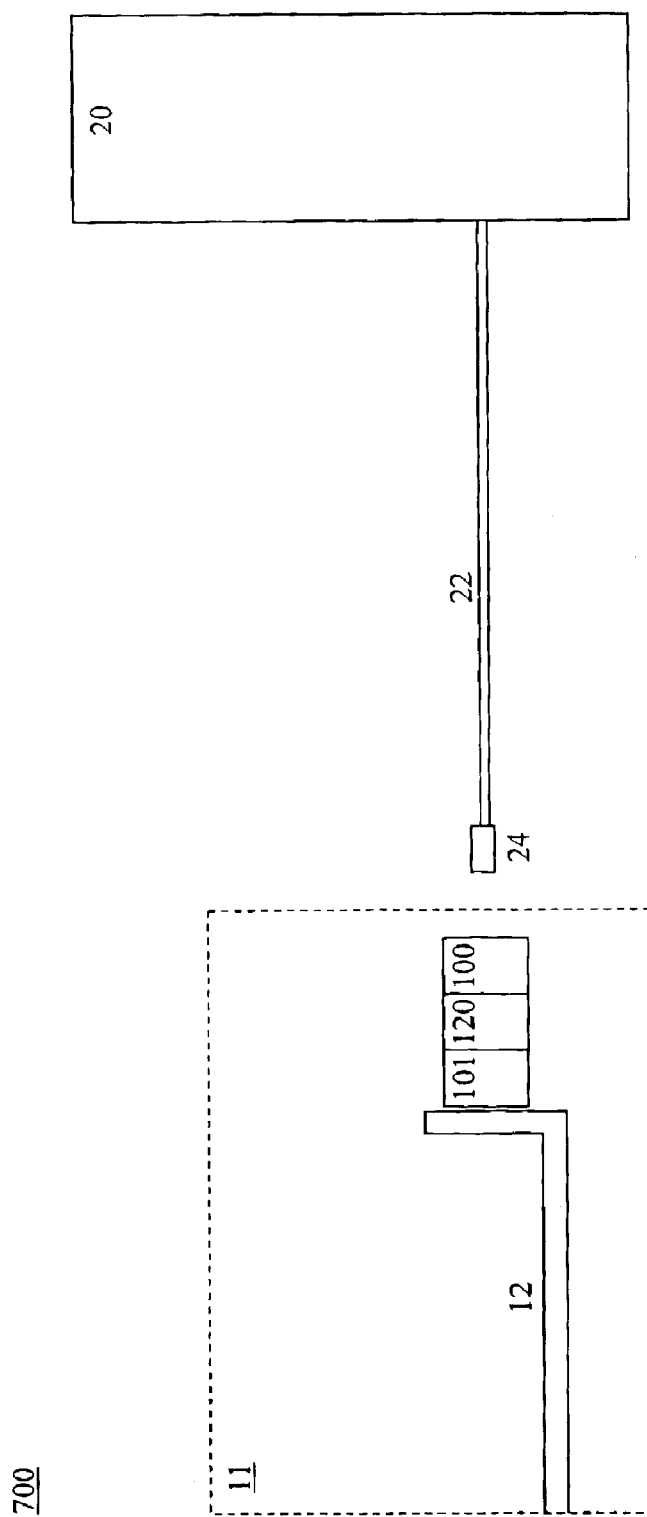
FIG. 7 illustrates a computer network, which includes a parallel optical module, optical fibers and system in accordance with one embodiment of the present invention.

FIG. 7 illustrates a computer network 700, which includes an optical module 11, optical fibers 22 and system 20 in accordance with one embodiment of the present invention. Optical module 11, in one aspect, is an optical transceiver, receiver and/or transmitter as described in FIG. 1. An optical transceiver may include a combination of various transmitters and receivers allowing to send and receive optical signals simultaneously. Referring to FIG. 7, optical module 11 includes an optoelectronic array package 101, optical lens array 120, optical fiber connector 100 and electronic circuit board 12. It should be noted that optical module 11 may be further coupled to a host digital processing device, not shown in FIG. 7, so that the host digital processing device can communicate with system 20 through optical media. It should be further noted that optical module 11 may include other electronic components, not shown in FIG. 7, such as optical power control, driver and/or amplifier circuits. It should also be noted that the term optical module 11 is also known as parallel optical module.

Referring to FIG. 7, first ends of optical fibers 22 are coupled to an optical cable connector 24, which can be either a male or female fiber connector that is cable of coupling to other optical devices such as an optical module. The other ends of optical fibers 22 are coupled to system 20, which, in various embodiments, could be a personal computer ("PC"), server, switcher, router or mainframe computer. Optical fibers 22 may contain multiple sets of fibers. For example, a set of 12 fibers may be used for sending optical signals while another set of 12 fibers may be dedicated to receiving optical signals. It should be noted that it does not depart from the scope of the present invention if an alternative structure is used.

Electrical circuit board 12, in one embodiment, is a flexible printed circuit board. As described earlier, the flexible printed circuit board may be bent or folded in any direction. The flexible printed circuit board is thin, rectangular and flexible with various edge contours, and it is composed of flexible metal layers that are sandwiched between insulating layers. In another embodiment, electrical circuit board 12 is a rigid printed circuit board. In this embodiment, optoelectronic array package 101 is capable of mounting on the edge of the printed circuit board using edge-mounting techniques, also known as "corner turn" or "side-way mounting" techniques. As mentioned earlier, an advantage of using the edge connection is to improve optical interface between the optoelectronic devices and optical fibers because the edge connection directs optical beams in substantial parallel with printed circuit board 12.

In operation, when optical fiber connector 24 is connected to optoelectronic array package 01, various optical signals can be communicated between optical module 11 and system 20 through optical fibers 22. If the optoelectronic array device 135 is an optical receiver, it converts optical signals to electrical signals. If optoelectronic array device 135 is an optical transmitter, it converts electrical signals to optical signals. When optoelectronic array device 135 is an optical transceiver, it sends and receives optical signals simultaneously.

In the foregoing specification the invention has been described with reference to specific exemplary embodiments thereof. It will, however, be evident that various modifications and changes may be made thereto without departing from the broader scope of the invention. The specification and drawings are, accordingly, to be regarded in an illustrative rather than restrictive sense.

What is claimed is:

1. A method of manufacturing an optical subassembly comprising:

coupling an optoelectronic array device having an array of optoelectronic devices to an array header;

verifying functionality and alignment of the array of optoelectronic devices coupled with the array header;

coupling a window cap, over the array of optoelectronic device, to the array header to form an optoelectronic array package;

creating a hermetically sealed environment between the window cap and the array header;

verifying functionality and alignment of the optoelectronic array package;

coupling an optical lens array having an array of lenses to an optical fiber connector to form an optical lens module;

verifying functionality and alignment of the optical lens array coupled with the optical fiber connector;

coupling the optoelectronic array package to the optical lens array to form the optical subassembly; and verifying functionality and alignment of the optical subassembly.

2. The method of claim 1, further comprising coupling an adapter between the optoelectronic array package and the optical lens array.

3. The method of claim 2, further comprising coupling an adapter between the optical lens array and the optical fiber connector.

* * * * *